United States Patent
Tsunekawa et al.

(10) Patent No.: US 8,139,123 B2
(45) Date of Patent: Mar. 20, 2012

(54) IMAGING DEVICE AND VIDEO SIGNAL GENERATING METHOD EMPLOYED IN IMAGING DEVICE

(75) Inventors: Norikazu Tsunekawa, Hyogo (JP); Seiji Okada, Osaka (JP); Akihiro Maenaka, Osaka (JP)

(73) Assignee: SANYO Electric Co., Ltd., Moriguchi (JP)

( * ) Notice: Subject to any disclaimer, the term of this patent is extended or adjusted under 35 U.S.C. 154(b) by 301 days.

(21) Appl. No.: 12/513,118

(22) PCT Filed: Oct. 19, 2007

(86) PCT No.: PCT/JP2007/070873
§ 371 (c)(1),
(2), (4) Date: Apr. 30, 2009

(87) PCT Pub. No.: WO2008/053791
PCT Pub. Date: May 8, 2008

(65) Prior Publication Data
US 2010/0053356 A1    Mar. 4, 2010

(30) Foreign Application Priority Data
Oct. 31, 2006   (JP) ................. 2006-295646

(51) Int. Cl.
*H04N 5/228* (2006.01)
*H04N 5/225* (2006.01)
*H04N 3/14* (2006.01)
*H04N 5/335* (2011.01)
*H04N 9/04* (2006.01)

(52) U.S. Cl. ............ 348/222.1; 348/220.1; 348/272
(58) Field of Classification Search ........ 348/222.1, 348/152–155, 143–144, 94, 402.1, 412.1–415.1, 348/208.1–208.5, 208.13–208.16, 600, 207.99
See application file for complete search history.

(56) References Cited

U.S. PATENT DOCUMENTS

| | | | |
|---|---|---|---|
| 7,181,092 B2 * | 2/2007 | Tsukioka | 382/312 |
| 2003/0020819 A1 | 1/2003 | Fukuda | |
| 2003/0227552 A1 * | 12/2003 | Watanabe | 348/220.1 |
| 2003/0231251 A1 * | 12/2003 | Tsukioka | 348/272 |
| 2007/0177236 A1 * | 8/2007 | Kijima et al. | 358/514 |
| 2008/0088711 A1 * | 4/2008 | Border et al. | 348/222.1 |

FOREIGN PATENT DOCUMENTS

JP    2000-134549    5/2000
(Continued)

OTHER PUBLICATIONS

Notification Concerning Transmittal of International Preliminary Report on Patentability, dated May 14, 2009. English translation included.

*Primary Examiner* — Nicholas Giles
*Assistant Examiner* — Pritham Prabhakher
(74) *Attorney, Agent, or Firm* — NDQ&M Watchstone LLP

(57) ABSTRACT

Provided is an imaging device comprising means for binning by adding up and reading out pixel signals from a plurality of pixels arranged in a first direction and a second direction of a pixel arrangement of an imaging element. The imaging device is provided with first means for changing a combination pattern of added pixel signals on a per-frame basis, and second means for generating image signals for one frame based on added signals from plural frames having different combination patterns.

8 Claims, 16 Drawing Sheets

FOREIGN PATENT DOCUMENTS

| | | |
|---|---|---|
| JP | 2000-295531 | 10/2000 |
| JP | 2002-57943 | 2/2002 |
| JP | 2002-369083 | 12/2002 |
| JP | 2003-046876 | 2/2003 |
| JP | 2003-338988 | 11/2003 |
| WO | 2005-064925 A1 | 7/2005 |

* cited by examiner

FIG. 3

(a): COMBINATIONS OF SIGNAL BINNING
(t SECOND)

(b): COMBINATIONS OF SIGNAL BINNING
(t+ Δ SECOND)

(c): COMBINATIONS OF SIGNAL BINNING
(t+2 Δ SECOND)

(d): COMBINATIONS OF SIGNAL BINNING
(t+3 Δ SECOND)

(a): BINNED SIGNALS (t SECOND)　　(b): BINNED SIGNALS (t+Δ SECOND)

(c): BINNED SIGNALS (t+2Δ SECOND)　(d): BINNED SIGNALS (t+3Δ SECOND)

FIG. 5

(a): SIGNAL BINNING (t SECOND)

(b): SIGNAL BINNING (t+ Δ SECOND)

(c): SIGNAL BINNING (t+2 Δ SECOND)

(d): SIGNAL BINNING (t+3 Δ SECOND)

FIG. 17

(a): COMBINATION OF INTERLACING SIGNALS
1 (t SECOND)

(b): COMBINATION OF INTERLACING SIGNALS
2 (t+Δ SECOND)

(c): COMBINATION OF INTERLACING SIGNALS
3 (t+2Δ SECOND)

(d): COMBINATION OF INTERLACING SIGNALS
4 (t+3Δ SECOND)

(a): INTERLACED SIGNALS 1 (t SECOND)

(b): INTERLACED SIGNALS 2 (t+Δ SECOND)

(c): INTERLACED SIGNALS 3 (t+2Δ SECOND)

(d): INTERLACED SIGNALS 4 (t+3Δ SECOND)

IMAGING DEVICE AND VIDEO SIGNAL GENERATING METHOD EMPLOYED IN IMAGING DEVICE

CROSS REFERENCE TO RELATED APPLICATIONS

This application is a National Stage Application of International Application No. PCT/JP2007/070873, filed Oct. 19, 2007, which International Application claims priority to Japanese Application No. JP 2006-295646, filed Oct. 31, 2006, both of which applications are incorporated by reference herein in their entireties.

TECHNICAL FIELD

The present invention relates to an imaging device and a video signal generating method employed in the imaging device.

BACKGROUND ARTS

In a case where a moving video picture is captured by an image sensor capable of capturing a still image of high pixel density, the readout speed of the sensor is not high enough so that a low frame rate results. Methods for binning pixel signals and methods for interlacing pixel signals are known as methods for achieving high frame rate.

Binning of the pixel signals is accomplished by adding up signals of plural adjacent pixels of the image sensor, such as signals of a total of 4 pixels including 2 horizontal pixels and 2 vertical pixels. Such binning of the pixel signals involves resolution deterioration. In this connection, Japanese Unexamined Patent Publication No. 2002-57943 discloses a technique wherein a binning phase is inverted on a row-by-row basis in binning horizontal/vertical pixel signals. This prior-art technique falls short of preventing the resolution deterioration although the deterioration of horizontal resolution can be reduced.

DISCLOSURE OF THE INVENTION

It is an object of the invention to provide an imaging device and a video signal generating method employed in the imaging device which can reduce the resolution deterioration in the binning of image signals.

It is another object of the invention to provide an imaging device and a video signal generating method employed in the imaging device which can reduce the resolution deterioration in the interlaced readout of image signals.

In accordance with the invention, a first imaging device comprising means for binning by adding up and reading out pixel signals from a plurality of pixels arranged in a first direction and a second direction of a pixel arrangement of an imaging element, the imaging device comprises: first means for changing a combination pattern of added pixel signals on a per-frame basis; and second means for generating image signals for one frame based on added signals from plural frames having different combination patterns.

The second means may generate the one-frame image signals from the added signals from the plural frames having the different combination patterns as referring to, for example, the added signals from the plural frames and information on motion between the plural frames.

In accordance with the invention, a first video signal generating method employed in an imaging device comprising means for binning by adding up and reading out pixel signals from a plurality of pixels arranged in a first direction and a second direction of a pixel arrangement of an imaging element, the method comprises: a first step of changing a combination pattern of added pixel signals on a per-frame basis; and a second step of generating image signals for one frame based on added signals from plural frames having different combination patterns.

The second step may generate the one-frame image signals from the added signals from the plural frames having the different combination patterns as referring to, for example, the added signals from the plural frames and information on motion between the plural frames.

In accordance with the invention, a second imaging device comprising means for performing interlaced readout of pixel signals from a plurality of pixels arranged in a first direction and in a second direction of a pixel arrangement of an imaging element, the imaging device comprises: first means for changing an interlacing pattern on a per-frame basis; and second means for generating image signals for one frame based on interlaced signals from plural frames having different interlacing patterns.

The second means may generate the one-frame image signals from the interlaced signals from the plural frames having the different interlacing patterns as referring to, for example, the interlaced signals from the plural frames and information on motion between the plural frames.

In accordance with the invention, a second video signal generating method employed in an imaging device comprising means for performing interlaced readout of pixel signals from a plurality of pixels arranged in a first direction and in a second direction of a pixel arrangement of an imaging element, the method comprises: a first step of changing an interlacing pattern on a per-frame basis; and a second step of generating image signals for one frame based on interlaced signals from plural frames having different interlacing patterns.

The second step may generate the one-frame image signals from the interlaced signals from the plural frames having the different interlacing patterns as referring to, for example, the interlaced signals from the plural frames and information on motion between the plural frames.

BRIEF DESCRIPTION OF THE DRAWINGS

FIG. 3 is a group of schematic diagrams showing the kinds of combination patterns of signal binning;

FIG. 5 is a schematic diagram showing one-frame image generated by combining together the added signals from four frames;

FIG. 17 is a group of schematic diagrams showing the kinds of interlacing patterns.

BEST MODES FOR CARRYING OUT THE INVENTION

The embodiments of the invention will hereinbelow be described with reference to the accompanying drawings.

[1] Embodiment 1

Figure 1:
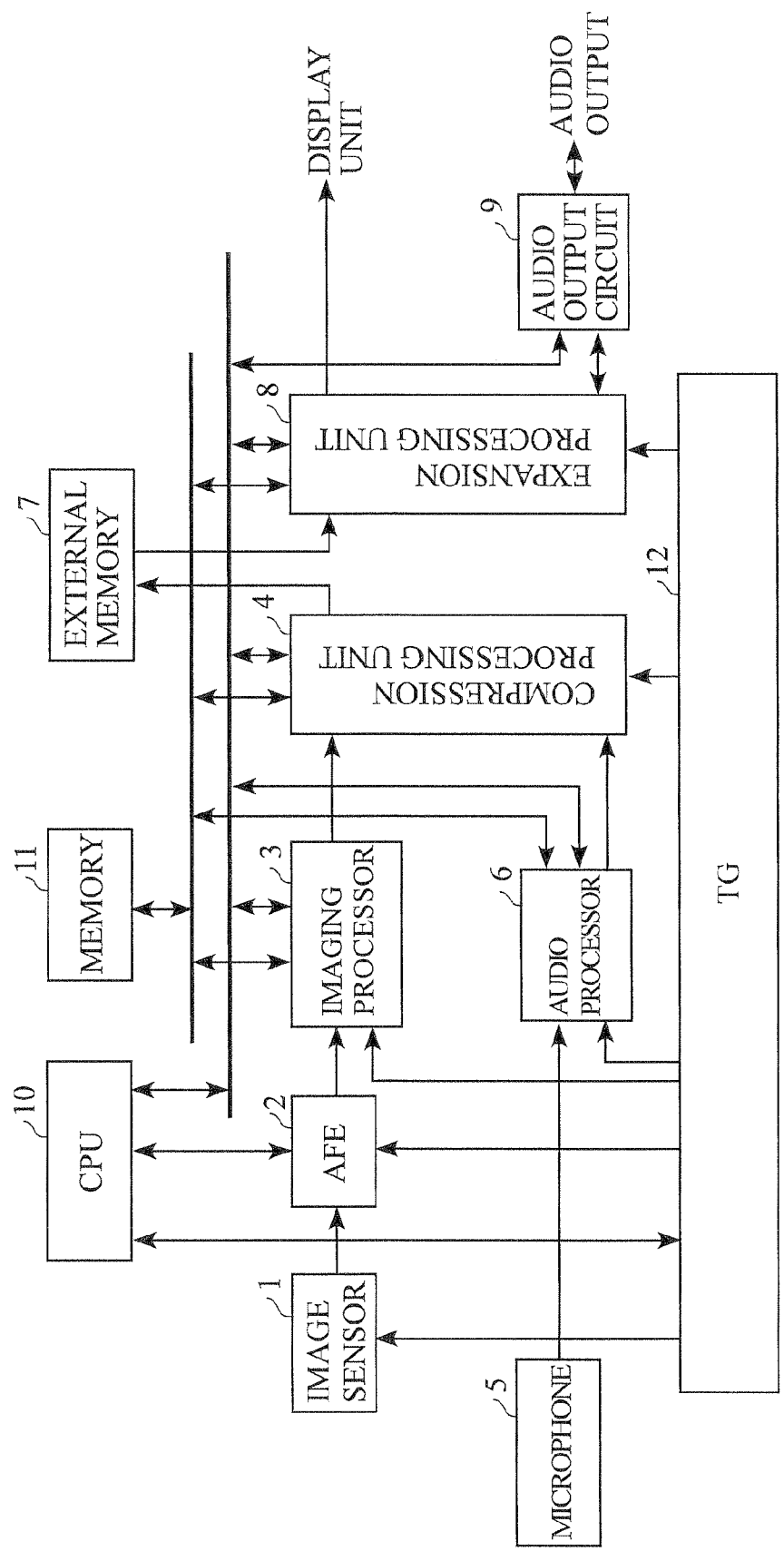
FIG. 1 is a block diagram showing an electrical configuration of a digital camera.

FIG. 1 shows an electrical configuration of a digital camera.

This digital camera adopts a single-chip imaging system. The embodiment adopts Bayer array as a color filter array employed by the single-chip imaging system.

An analog image signal acquired by an image sensor 1 is sent to an AFE (Analog Front End) 2 for conversion to a digital image signal. The digital image signal supplied by the AFE 2 is subjected to a predetermined processing by an imaging processor 3 before sent to a compression processing unit 4. The embodiment employs a CCD as the image sensor 1.

An analog audio signal acquired by a microphone 5 is converted to a digital audio signal by an audio processor 6 and the resultant digital audio signal is sent to the compression processing unit 4. The audio and image signals sent to the compression processing unit 4 are compressed by the compression processing unit 4 and then, are stored in an external memory 7.

The compressed data in the external memory 7 is reproduced as follows. The compressed data in the external memory 7 is sent to an expansion processing unit 8 for expansion. The digital image signals generated by the expansion processing unit 8 are sent to a display unit so as to be displayed. The digital audio signals generated by the expansion processing unit 8 are converted to analog audio signals by an audio output circuit 9 before outputted.

A memory 11 temporarily stores data during signal processing. A TG 12 generates timing control signal, image-sensor driving pulse and the like. A CPU 10 is responsible for the control of the entire system.

Figure 2:
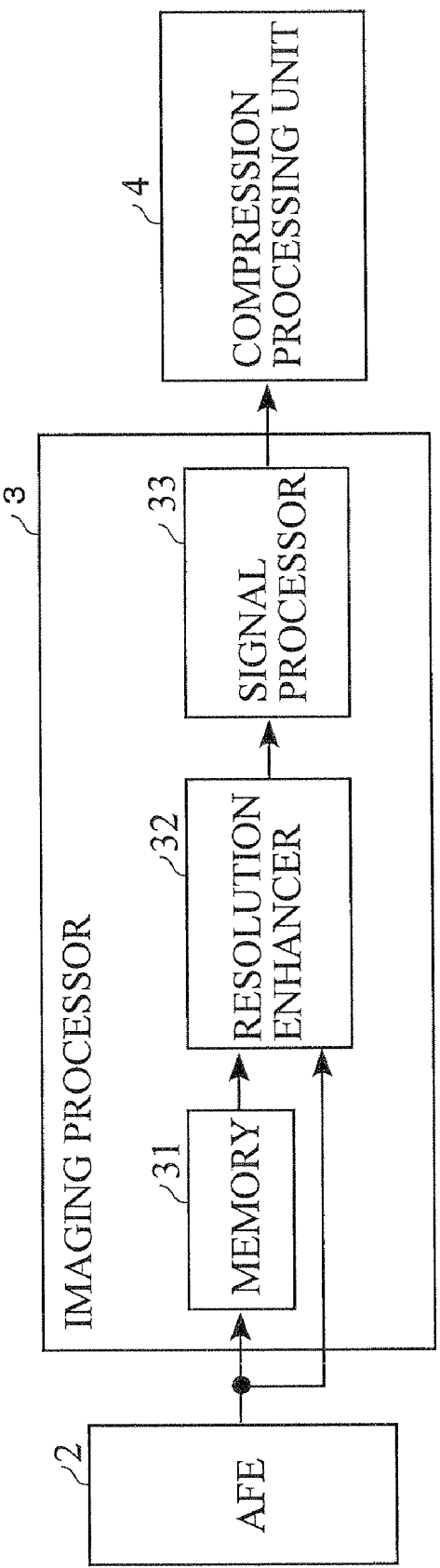
FIG. 2 is a block diagram showing an electrical configuration of an imaging processor 3.

FIG. 2 shows a configuration of the imaging processor 3.

The imaging processor 3 comprises a memory 31, a resolution enhancer 32 and a signal processor 33. The digital image signal generated by the AFE 2 is sent to the memory 31 for storage and is also sent to the resolution enhancer 32. The resolution enhancer 32 performs a resolution enhancement processing based on digital image signals for a predetermined number of frames so as to generate digital image signals for one frame. The signal processor 33 generates Y, U, V luminance signals and color difference signals from the digital image signals supplied from the resolution enhancer 32.

Now, description is made on an operation of binning pixel signals. In this embodiment, the CPU 10 controls the TG 12 thereby changing the combination pattern of signal binning on the image sensor 1 and reading out added signals. The analog image signals (added signals or binned signals) read out by the image sensor 1 are converted to the digital image signals by the AFE 2. Subsequently, the digital image signals are sent to the imaging processor 3 so as to be subjected to the resolution enhancement processing and the like, The digital image signals so generated by the imaging processor 3 are compressed by the compression processing unit 4. Subsequently, the resultant signals are stored in the external memory 7.

FIG. 3 shows the kinds of combination patterns of signal binning. The embodiment uses four kinds of combination patterns of signal binning 'a' to 'd'. In each of 3(a) to 3(d) showing the combination patterns, an upper left block shows a combination pattern for binning GB-G pixels (G pixels on GB lines), an upper right block showing a combination pattern for binning B pixels, a lower left block showing a combination pattern for binning R pixels, a lower right block showing a combination pattern for binning GR-G pixels (G pixels on GR lines).

In the pattern 'b', each pixel of a binning object color is shifted rightward by one pixel relative to the corresponding pixel of the pattern 'a'. In the pattern 'c', each pixel of a binning object color is shifted downward by one pixel relative to the corresponding pixel of the pattern 'a'. In the pattern 'd', each pixel of a binning object color is shifted rightward and downward by one pixel relative to the corresponding pixel of the pattern 'a'.

The image sensor 1 reads out the added signals at predetermined time intervals (Δ second intervals) as changing the combination pattern of signal binning in the order of 'a'→'b'→'c'→'d'→'a'. In consequence, the added signals read out by the image sensor 1 are arranged as shown in FIG. 4(a) to FIG. 4(d). The added signals shown in FIG. 4(a) to FIG. 4(d) correspond to the respective patterns 'a' to 'd' of FIG. 3.

The added signals read out by the image sensor 1 are converted to the digital image signals by the AFE2 and then, are stored in the memory 31 in the imaging processor 3 and are also sent to the resolution enhancer 32. The memory 31 is configured to store image data on a predetermined number of latest frames. The resolution enhancer 32 generates one-frame image data by performing the resolution enhancement processing on each frame using the image data on a total of four to five frames including the current frame and three or four preceding frames.

Figure 5:
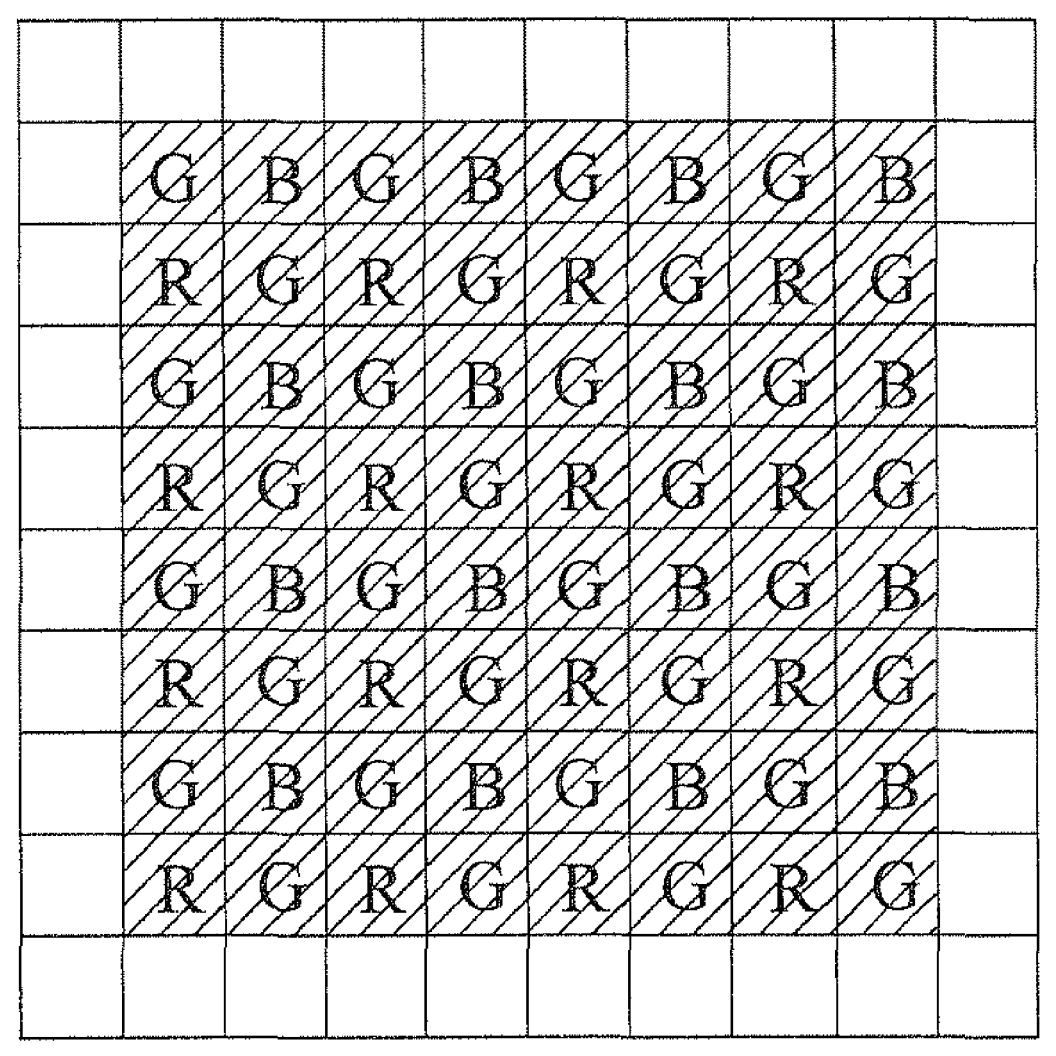

The resolution enhancer 32 generates one-frame image by combining, for example, image data on four frames including the current frame and the three preceding frames. In this manner, the four-frame image data are combined together to generate a high-resolution image, as shown in FIG. 5.

In a case where any motion exists between the images of the four frames, however, combining these images as they are may produce a blurred image. It is therefore favorable to generate one-frame image taking interframe motion information into consideration. Now, description is made on the contents of a processing by the resolution enhancer 32 generating the one-frame image taking the interframe motion information into consideration. There are two types of processes that the resolution enhancer 32 may perform in this case.

A first process is described. It is assumed here that F1 represents the added signals at time t second in FIG. 4, F2 representing the added signals at time t+Δsecond, F3 representing the added signals at time t+2Δsecond, F4 representing the added signals at time t+3Δsecond, F5 representing the added signals at time t+4Δsecond. Description is made on a case where one-frame image data is generated based on the added signals F1 to F5. The latest frame F5 of the frames F1 to F5 serves as a reference frame.

According to the first process, two frames having the same combination pattern of signal binning are mutually compared so as to determine whether or not any motion exists between each pair of corresponding pixels (effective pixels) having the added signals in these frames. In this case, the added signal F5 as the reference is compared with the added signal F1 from the four preceding frame having the same combination pattern (the pattern 'a' in this embodiment) so as to determine whether or not any motion exists between each pair of corresponding effective pixels. The motion is detected by determining whether a difference between these pixel values is less than a predetermined threshold value or not.

A pixel is determined to be motionless if this pixel satisfies the following expression (1):

$$|X_t - X_{t+4}| < \alpha \tag{1}$$

where $X_{t+4}$ represents the pixel value of the added signal F5 and $X_t$ represents the pixel value of the added signal F1.

Out of the blank pixels (pixels without the added signal) in the frame of the added signal F5 as the reference, a blank pixel between the effective pixels determined to be motionless is combined with any of the added signals F2 to F4 from the frames having the other combination patterns. Of the blank pixels (pixels without the added signals) in the frame of the added signal F5, a blank pixel between the effective pixels determined to contain motion is interpolated with the added signal F5. Of the blank pixels in the frame of the added signal F5, a blank pixel between the effective pixel determined to be motionless and the effective pixel determined to contain motion is interpolated using the value interpolated with the added signal F5 and a value of any of the added signals F2 to F4 from the frames having the other combination patterns.

Figure 6:
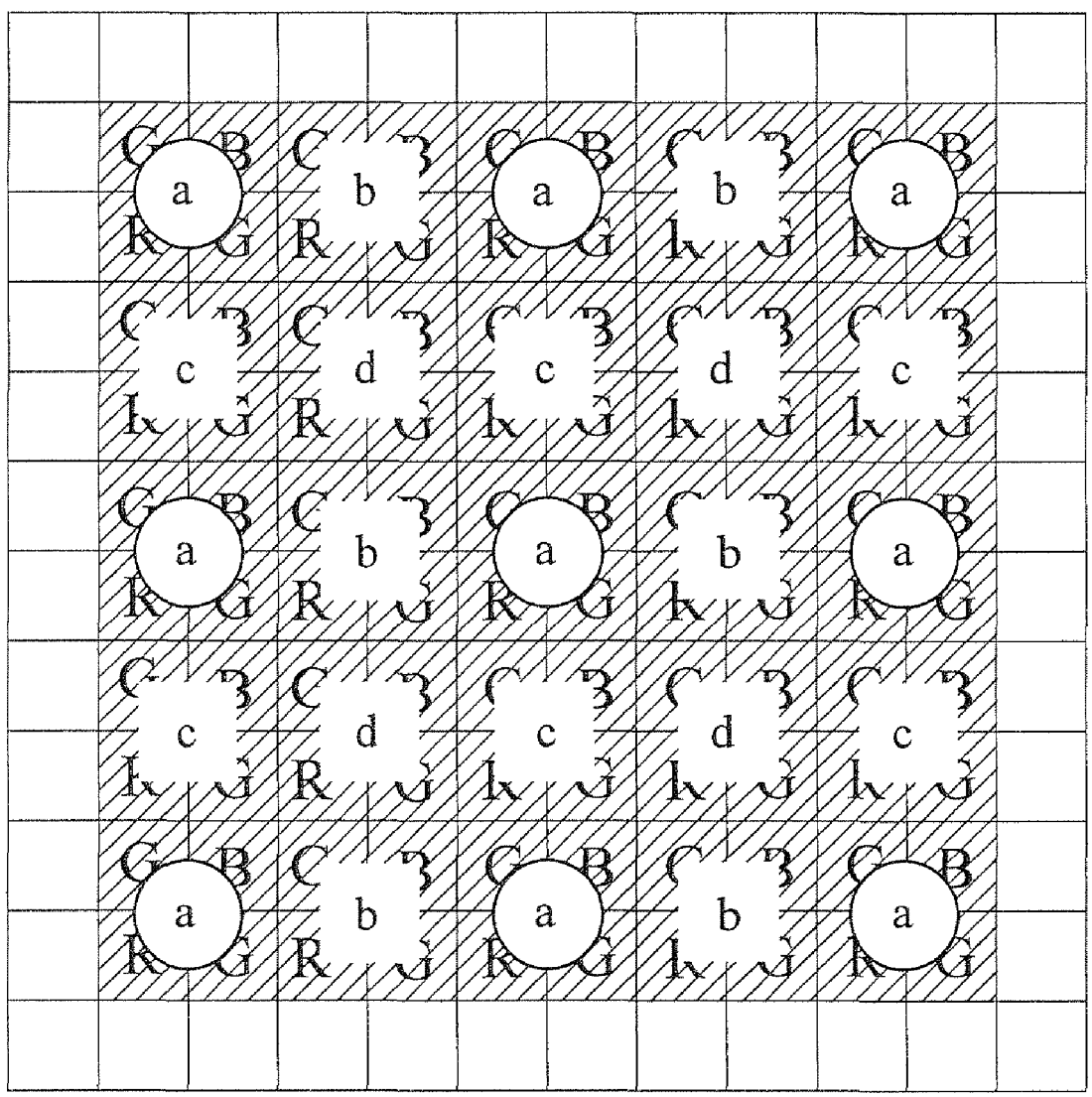
FIG. 6 is a schematic diagram showing a case where all the effective pixels of a frame are determined to be motionless by comparing an added signal F5 as a reference with any of the other added signals exclusive of an added signal F1.

FIG. 6 shows a case where all the effective pixels are determined to be motionless when the added signal F5 as the reference is compared with any of the other added signals exclusive of the added signal F1. For simplicity, FIG. 6 illustrates an example in which motion detection is performed on each unit of four pixels GB-G, B, R and GR-G. However, the motion detection may be performed on a per-pixel basis.

In FIG. 6, each four-pixel unit represented by "a" denotes the effective pixel assigned with the added signal F5, each four-pixel unit represented by "b" denoting the effective pixel assigned with the added signal F2, each four-pixel unit represented by "c" denoting the effective pixel assigned with the added signal F3, each four-pixel unit represented by "d" denoting the effective pixel assigned with the added signal F4. The pixel marked with circle represents one determined to be motionless. In the case shown in FIG. 6, one-frame image is generated by combining the added signal F5 with the added signals F2 to F4 from the frames having the other combination patterns.

Figure 7:
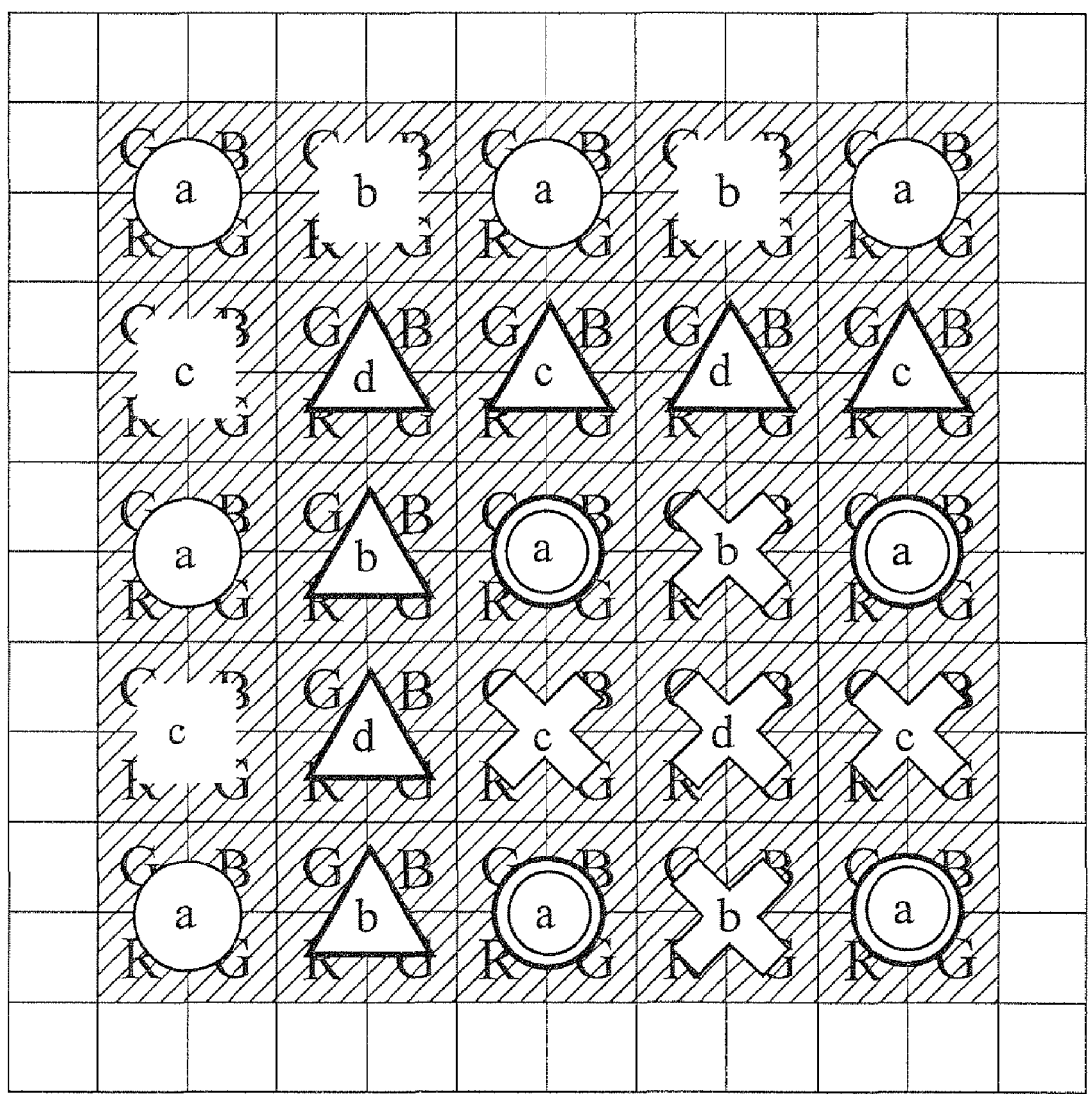
FIG. 7 is a schematic diagram showing a case where a frame is a mixture of pixels determined to be motionless and determined to contain motion by comparing the added signal F5 as the reference with any of the other added signals exclusive of the added signal F1.

FIG. 7 shows a case where a frame is a mixture of pixels determined to be motionless and determined to contain motion when the added signal F5 as the reference is compared with any of the other signals exclusive of the added signal F1.

In FIG. 7, the pixel marked with circle represents one determined to be motionless and the pixel marked with double circle represents one determined to contain motion. The pixel marked with triangle represents one between the pixel determined to be motionless and the pixel determined to contain motion. The pixel marked with cross represents one between the pixels determined to contain motion.

The value of the pixel marked with cross is interpolated only with the added signal F5. The value of the pixel marked with triangle is interpolated using the value interpolated with the added signal F5 and any of the added signals F2 to F4 from the frames having the other combination patterns. For instance, the value of a certain-color pixel in the four-pixel unit marked with "c" enclosed in triangle is generated by weighted summation of a pixel value interpolated using the values of a pixel having the corresponding color and belonging to the upper four-pixel unit ("a" enclosed in circle) and a pixel having the corresponding color and belonging to the lower four-pixel unit ("a" enclosed in double circle), and a pixel value of a pixel having the corresponding color and belonging to the pixel unit assigned with the added signal F3 and marked with "c" enclosed in triangle.

A blank pixel not sandwiched between the effective pixels of the frame F5 as the reference, i.e., a blank pixel present in a frame end area of the frame F5, is ignored because motion detection thereon or interpolation thereof is impossible.

Next, a second process is described. It is assumed here that F1 represents the added signals at time t second in FIG. 4, F2 representing the added signals at time t+Δsecond, F3 representing the added signals at time t+2Δsecond, F4 representing the added signals at time t+3Δsecond, F5 representing the added signals at time t+4Δsecond. Description is made on a case where one-frame image data is generated based on the added signals F2 to F5. The latest frame F5 of the frames F2 to F5 serves as the reference frame.

According to the second process, the reference frame is compared with each of the other frames having the different combination patterns whereby each of the pixels (effective pixels) belonging to the other frames and having the added signals is checked to determine whether or not the pixel of interest contains motion. In this case, each of the added signals F2 to F4 is compared with the added signal F5 as the reference. It is noted, however, that two frames to be compared have mutually different combination patterns of signal binning and hence, a respective pair of corresponding effective pixels of these frames are located at different positions. In the reference frame, therefore, the value of the pixel corresponding to the pixel belonging to the other frame as the comparison subject and having the added signal is generated by interpolation. Thereafter, these frames are compared.

Now, description is made on a case where the frame F5 as the reference (combination pattern 'a') is compared with the frame F4 (combination pattern 'd').

Figure 8:
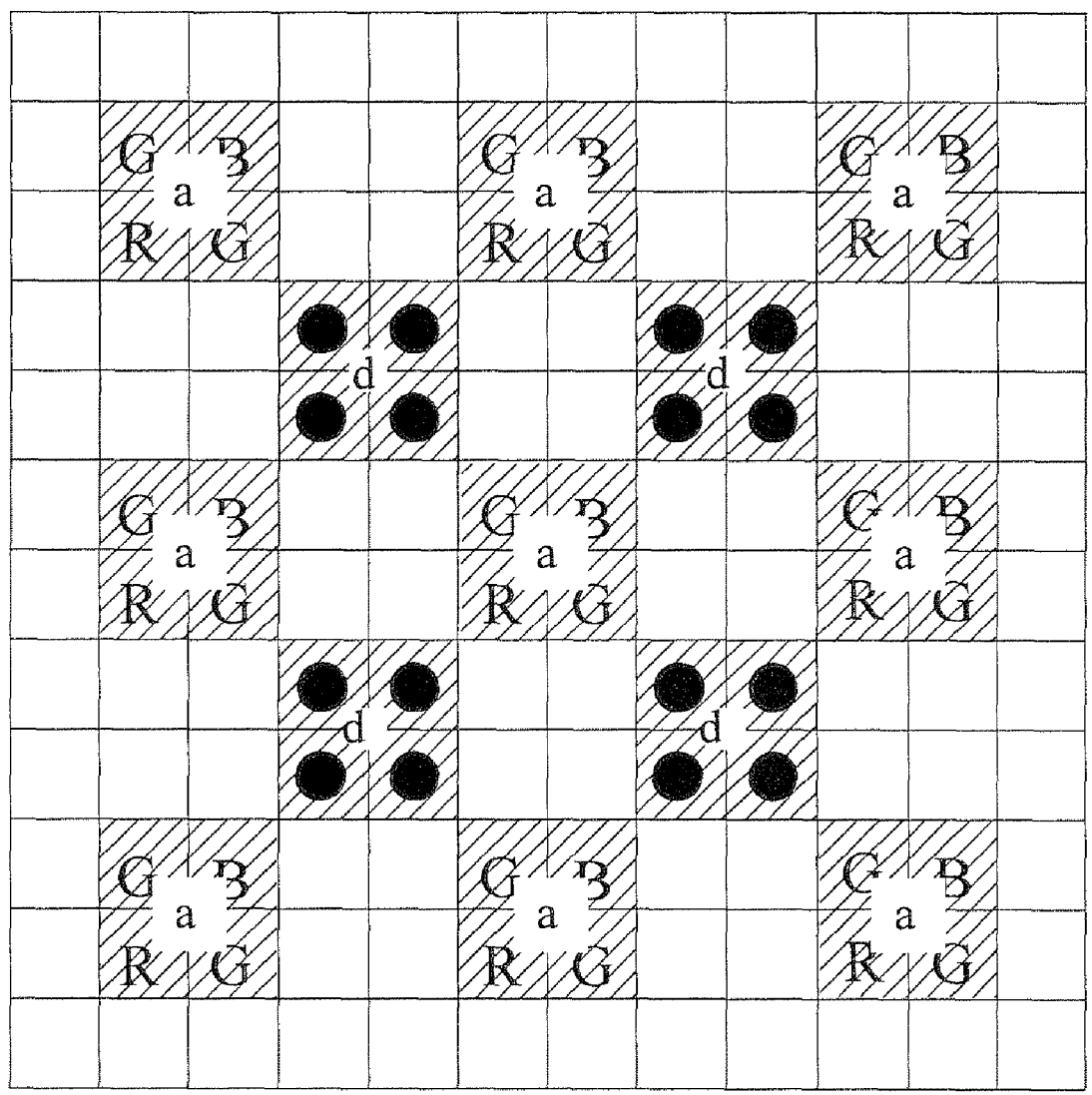
FIG. 8 is a schematic diagram for explaining a case where the frame F5 (combination pattern 'a') as the reference is compared with a frame F4 (combination pattern 'd')

As shown in FIG. 8, the pixel value corresponding to the effective pixel (represented by black circle) in the combination pattern 'd' of the frame 4 is generated by interpolating the effective pixel of the frame F5. Subsequently, the value of each of the pixels (pixels represented by black circle) interpolated based on the frame F5 is compared with the value of the corresponding pixel of the frame F4.

It is assumed that with respect to any of the pixels represented by black circle shown in FIG. 8, $X_{ad}$ denotes the pixel value generated by interpolation based on the frame F5 and $X_d$ denotes the value of the corresponding pixel of the frame F4.

If the absolute value of a difference between these pixel values satisfies the following expression (2), namely if the absolute value of the difference between these pixel values is less than a first threshold α1, the pixel of interest is determined to be motionless and the frame F5 is combined with the corresponding pixel of the frame F4 (the value of the corresponding pixel of the frame F4 is adopted as the value of the pixel of interest).

$$|X_d - X_{ad}| < \alpha 1 \quad (2)$$

If the absolute value of the difference between these pixel values satisfies the following expression (3), namely if the absolute value of the difference between these pixel values is greater than a second threshold α2 which is greater than the first threshold α1 (α2>α1), the pixel of interest is determined to contain motion and the value generated by interpolation based on the frame F5 is adopted as the value of the pixel of interest.

$$|X_d - X_{ad}| > \alpha 2 \quad (3)$$

If the absolute value of the difference between these pixel values satisfies the following expression (4), namely if the absolute value of the difference between these pixel values is α1 or more and α2 or less, the value of the pixel of interest is generated using the interpolated value $X_{ad}$ based on the frame F5 and the value $X_d$ of the corresponding pixel of the frame F4.

$$\alpha 1 \leq |X_d - X_{ad}| \leq \alpha 2 \quad (4)$$

Figure 9:
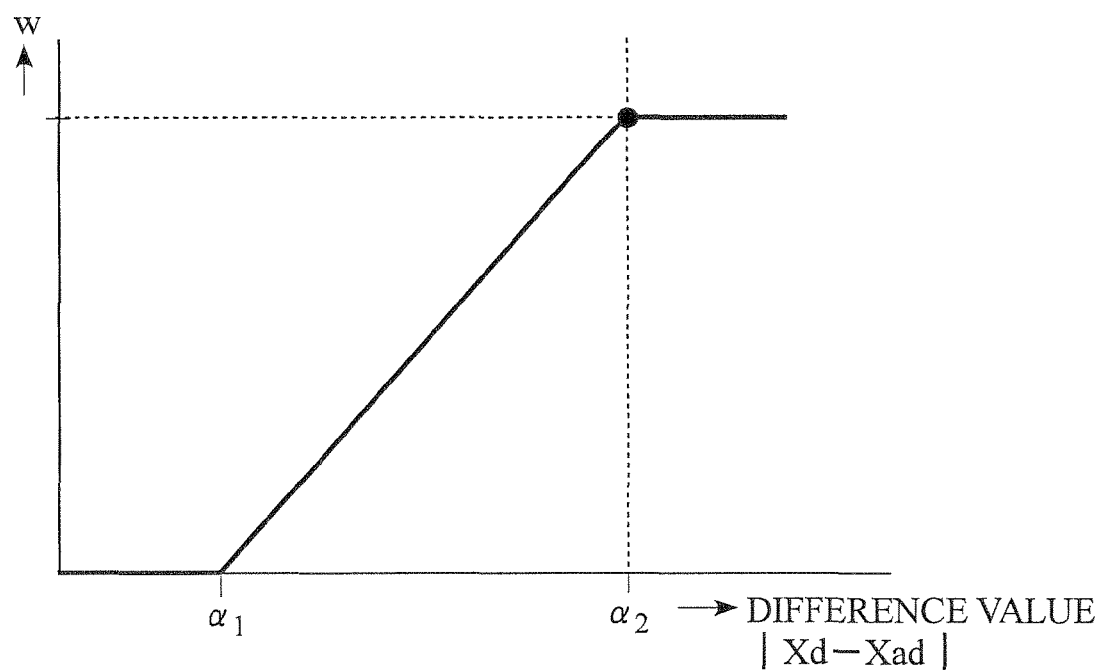
FIG. 9 is a graph showing a relation of weight w to difference value $|X_d-X_{ad}|$.

Specifically, a weight w is determined based on a predetermined relation of the weight w to the difference value $|X_d - X_{ad}|$, as shown in FIG. 9. The value X of the pixel of interest is calculated using the following equation (5)

$$X = w \cdot X_d + (1-w) \cdot X_{ad} \quad (5)$$

The same processing is also performed on the respective pairs of the frame F5 as the reference and the other frames F2, F3.

A blank pixel not sandwiched between the effective pixels of the frame F5 as the reference, i.e., a blank pixel present in the frame end area of the frame F5, is ignored because motion detection thereon or interpolation thereof is impossible.

Figure 10:
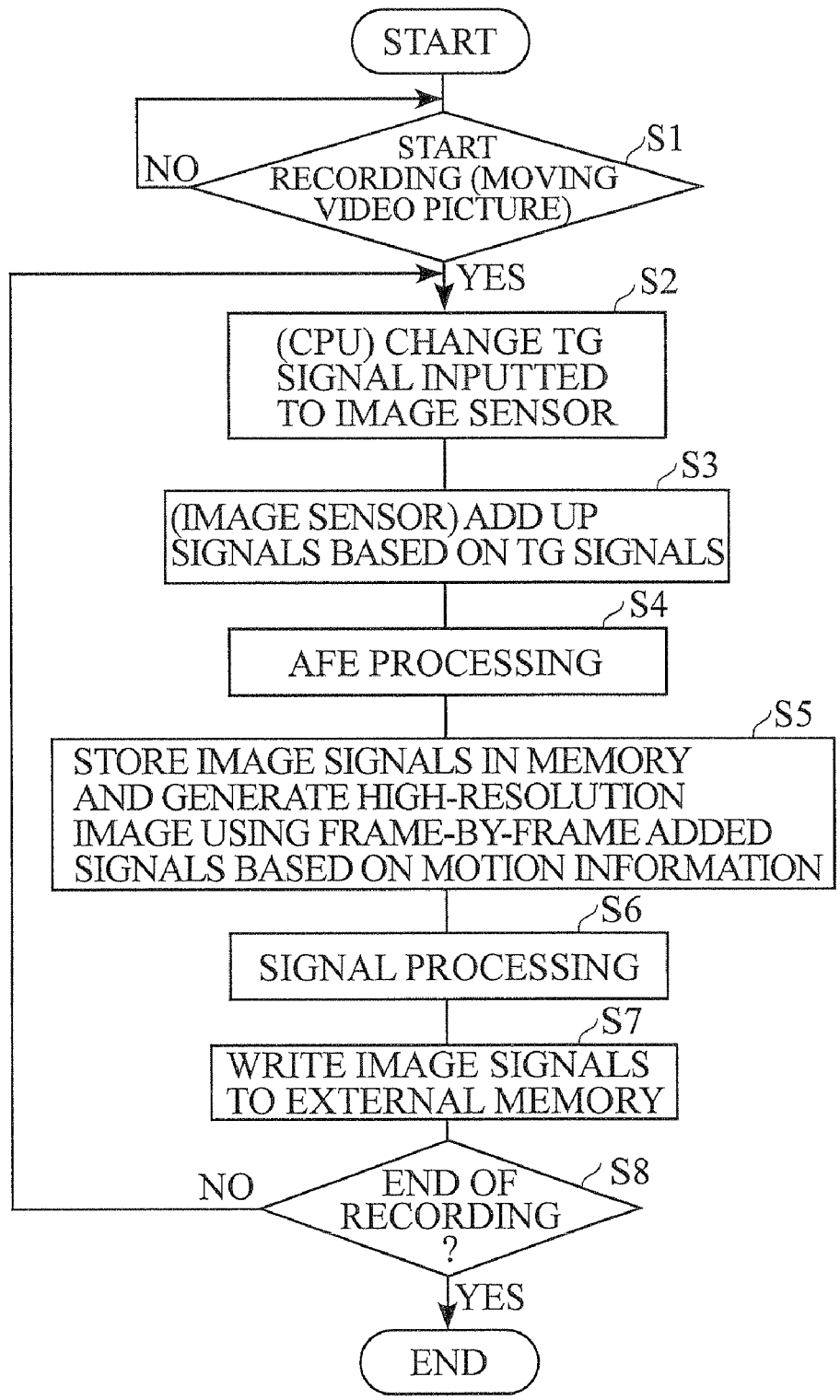
FIG. 10 is a flow chart showing the steps of a recording operation of the digital camera.

FIG. 10 shows a recording operation of the digital camera.

When the recording operation is started (Step S1), the CPU 10 changes a TG signal inputted to the image sensor 1 in order to change the combination pattern of signal binning (Step S2).

The image sensor 1 provides an output by adding up the signals based on the TG signals (Step S3). Analog image signals outputted from the image sensor 1 are sent to the AFE2 for conversion to digital image signals (Step S4). The digital image signals generated by the AFE2 are sent to the memory 31 in the imaging processor 3 for storage and are also sent to the resolution enhancer 32, which generates high-resolution image data using the digital image signals for a predetermined number of frames based on the motion information (Step S5).

The digital image signals generated by the resolution enhancer 32 are subjected to the predetermined signal processing by the signal processor 33 and the compression processing unit 4 (Step S6) and then, are written to the external memory 7 (Step S7). If the recording operation is not ended (Step S8), the operation flow returns to Step S2. If the operation flow comes to the end, the recording operation is ended.

Figure 4:
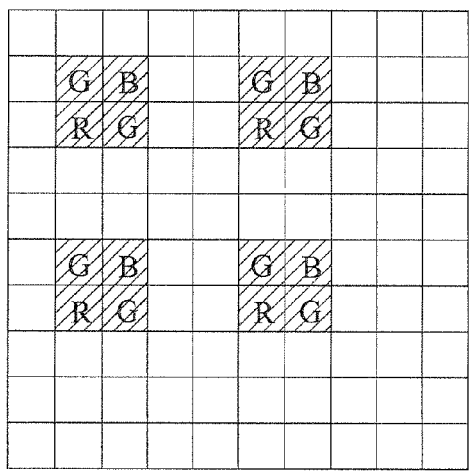
FIG. 4 is a group of schematic diagrams showing added signals read out by an image sensor 1.
Figure 4:
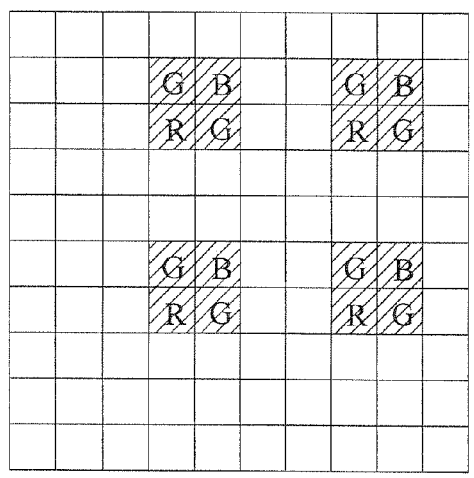
Figure 4:
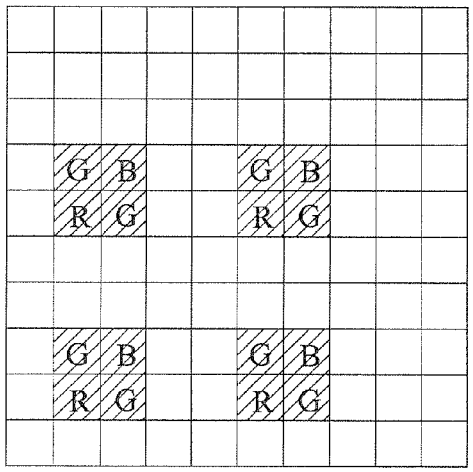
Figure 4:
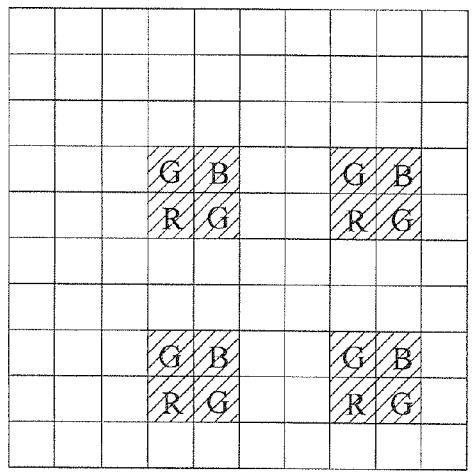

In the above embodiment, the combination patterns of signal binning are changed in the order of 'a'→'b'→'c'→'d'→'a'→ . . . as shown in FIG. 4. This order provides the high-resolution images in a case where some moving object exists on the image.

In a case where a minor motion exists on the image, a Δ-second period provides a higher probability of interframe signal combination than a 2Δ second period. If the signals of the frames 'a' and 'd' of FIG. 4 are combined together or the signals of the frames 'b' and 'c' of FIG. 4 are combined together, the signals are diagonally arranged, thus generating an image of a higher resolution as compared with a case where the signals of the frames 'b' and 'd' or of the frames 'a' and 'c' are combined together.

In a case where the image contains some moving object, therefore, an image having a higher resolution may be generated by adopting the combination patterns of signal binning arranged in the order of 'a'→'b'→'c'→'d'→'a'→ . . . as suggested by the above embodiment, rather than the combination patterns arranged in the order of 'a'→'b'→'d'→'c'→'a'→ . . . .

While the above embodiment illustrates the example where the horizontal/vertical pixel binning is performed on a two-by-two basis, the invention is also applicable to other binning processes wherein the horizontal/vertical pixel binning is performed on a three-by-three basis, four-by-four basis and the like.

[2] Embodiment 2

Figure 11:
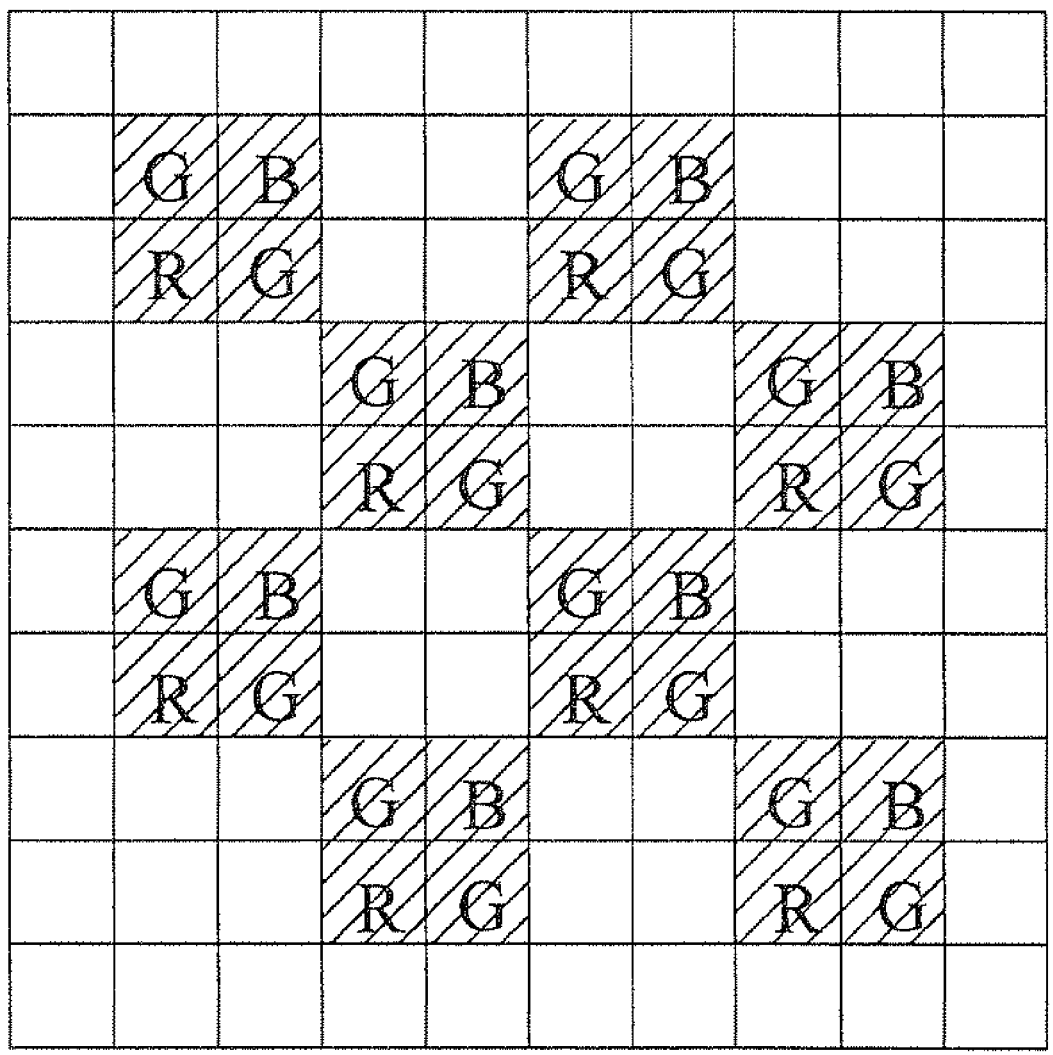
FIG. 11 is a schematic diagram showing one-frame image generated by combining together the added signals of the pattern 'a' and the added signals of the pattern 'd'.

While the image sensor 1 of the above embodiment 1 sequentially generates the four kinds of added signals, the image sensor may also generate two kinds of added signals alternately. The image sensor may alternately generate the added signals of the pattern 'a' of FIG. 4 and the added signals of the pattern 'd' of FIG. 4, for example. The resolution enhancer 32 combines the added signals of the pattern 'a' with the added signals of the pattern 'd'. The combined signals generate an image as shown in FIG. 11. It is noted however that this image includes more deficient pixels (blank pixels) than the image shown in FIG. 5 and hence, the values of the blank pixels are generated by interpolation.

[3] Embodiment 3

Figure 12:
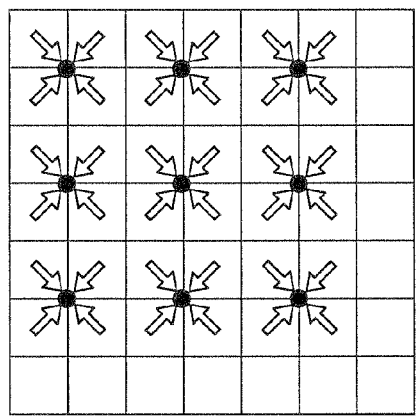
FIG. 12 is a group of schematic diagrams showing frame-by-frame combination patterns of signal binning in each of the imaging elements in a case where a 3-chip imaging system is adopted as an imaging system.
Figure 12:
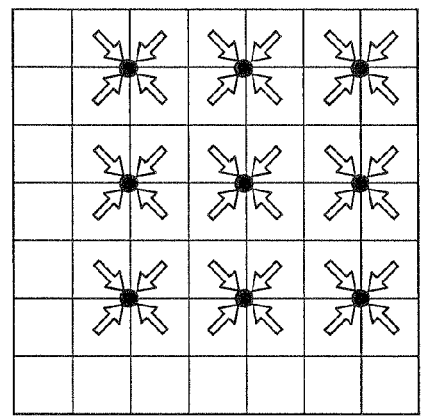
Figure 12:
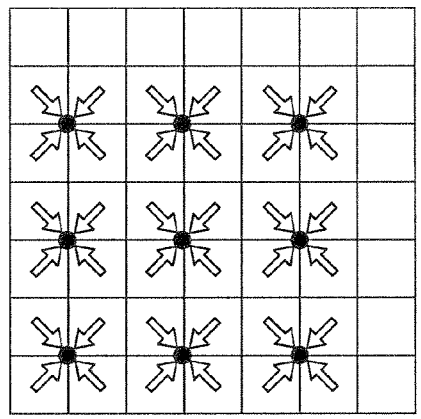
Figure 12:
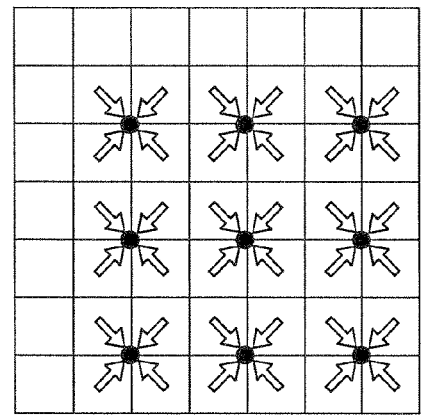
Figure 13:
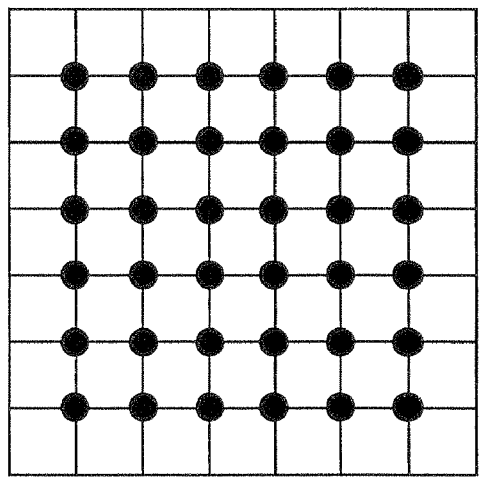
FIG. 13 is a schematic diagram showing one-frame image generated by combining together the four kinds of added signals shown in FIG. 11.

The above embodiment 1 adopts the single-chip imaging system as the imaging system. In a case where a 3-chip imaging system is adopted, each of the imaging devices may have frame-by-frame combination patterns of signal binning arranged as shown in FIG. 12. In this case, the added signals for four frames are combined together to generate an image shown in FIG. 13.

[4] Embodiment 4

The embodiments 1 to 3 illustrate the examples where the pixels are increased from the number of binned pixels (if the original number of N×N pixels are subjected to the horizontal/vertical pixel binning on a two-by-two basis, the number of binned pixels is N/2×N/2) whereby the high-resolution image (N×N pixels) is formed. However, this embodiment illustrates a case where an image having as many pixels as the binned pixels (image having N/2×N/2 pixels) is formed.

Figure 14:
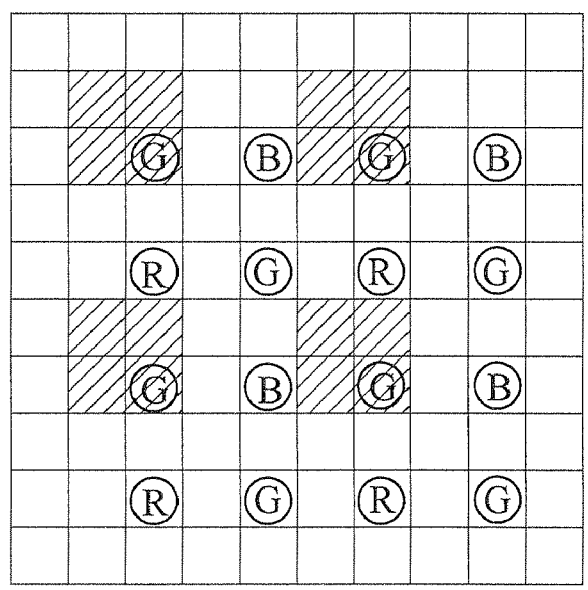
FIG. 14 is a schematic diagram for explaining a conventional method for generating an image comprising as many pixels as binned pixels and having equal pixel spacing.

Description is made on a case where the horizontal/vertical pixel binning is performed on a two-by-two basis. The prior-art technique has a problem that if the signals are binned as shown in FIG. 4(a), for example, the pixels are spaced irregularly so that diagonal lines suffer aliasing. It is therefore contemplated to make interpolation such as to equalize the pixel spacing. A pixel arrangement having the equal pixel spacing is formed by the pixels marked with circle as shown in FIG. 14. A value of each of the pixels marked with circle is generated by interpolating with a value of its neighboring pixel. However, this approach involves fear of image deterioration because there are a small number of pixels available for the interpolation.

Figure 15:
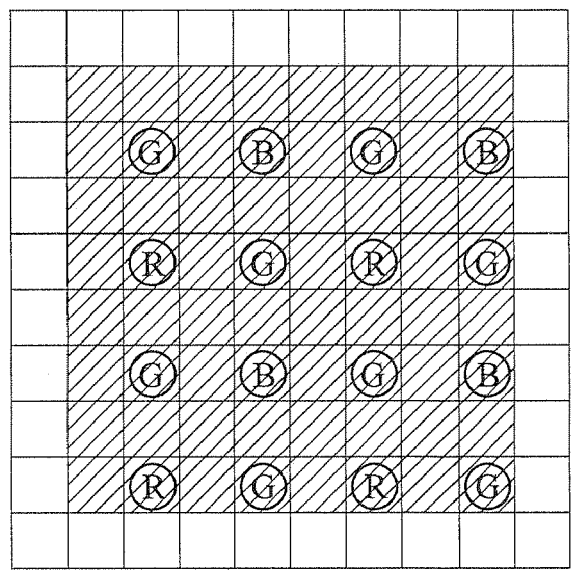
FIG. 15 is a schematic diagram for explaining a method of an embodiment of the invention for generating the image comprising as many pixels as binned pixels and having the equal pixel spacing.

In an embodiment 4 just as in the embodiment 1, the image sensor 1 sequentially generates the added signals of the four patterns 'a' to 'd' shown in FIG. 4. The imaging processor 3 performs the resolution enhancement processing for combining or interpolating the added signals for the four frames, whereby the one-frame image is formed as shown in FIG. 5. Then, the values of pixels (marked with circle) arranged with equal pixel spacing are interpolated based on the resultant one-frame image whereby the image comprising as many pixels as the binned pixels and having the equal pixel spacing is formed, as shown in FIG. 15. In this case, the image deterioration can be reduced because a larger number of pixels are available for interpolation.

[5] Embodiment 5

Figure 16:
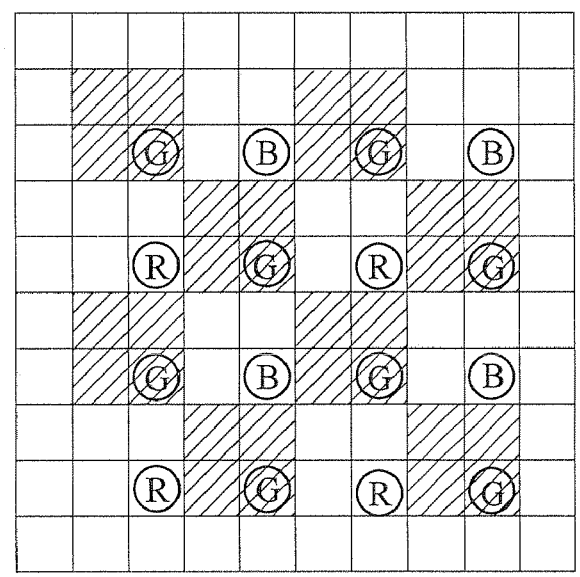
FIG. 16 is a schematic diagram for explaining a method of another embodiment of the invention for generating the image comprising as many pixels as binned pixels and having the equal pixel spacing.
Figure 18:
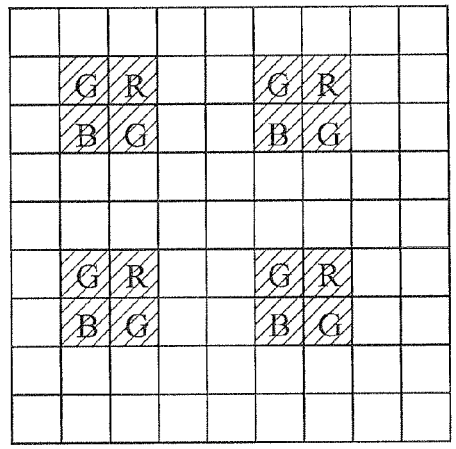
FIG. 18 is a group of schematic diagrams each showing interlaced signals read out by the image sensor 1.
Figure 18:
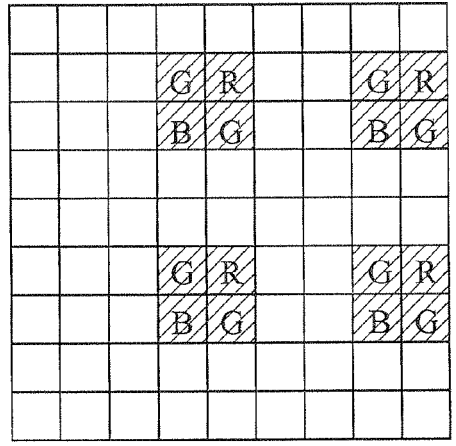
Figure 18:
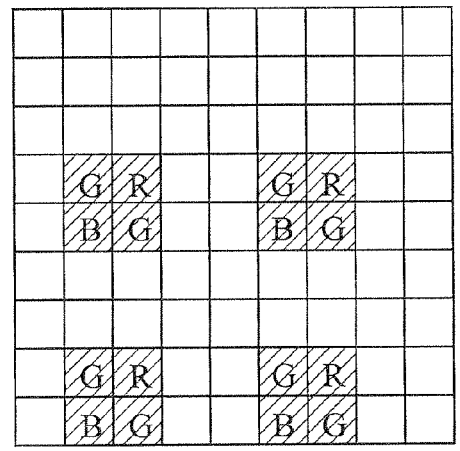
Figure 18:
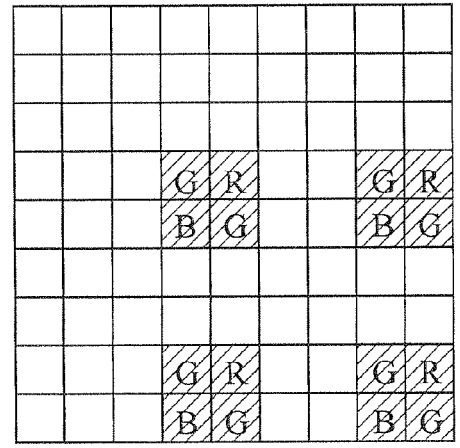

According to the embodiment 4, the one-frame image (FIG. 5) formed by combining or interpolating the added signals for the four frames is used for interpolating the values of the pixels marked with circle in FIG. 15. In an embodiment 5, the image (FIG. 11) formed by combining the added signals for the two frames, as illustrated by the embodiment 2, is so processed as to interpolate the values of pixels marked with circle shown in FIG. 16, whereby the image comprising as many pixels as the binned pixels and having the equal pixel spacing is formed.

[6] Embodiment 6

In an embodiment 6, the image comprising as many pixels as the binned pixels is generated as follows. In this embodiment, the image having the equal pixel spacing as illustrated by the embodiments 4 and 5 is not formed. An RGB image is generated from a Bayer color array image obtained by combining together the added signals for plural frames, as shown in FIG. 5 and FIG. 11. The resultant RGB image is subjected to pixel reduction whereby the image comprising as many pixels as the binned pixels is generated. If, in this process, the Bayer color array image generated by combining together the added signals for the plural frames contains blank pixels as shown in FIG. 11, the image data is interpolated when it is subjected to pixel reduction.

[7] Embodiment 7

In the above Embodiments 1 to 6, the added signals (binned signals) obtained by signal binning are subjected to the processing (referred to as the resolution enhancement processing) performed by the imaging processor 3 for enhancing the resolution. The same resolution enhancement processing as that of the above embodiments 1 to 6 may also be performed on interlaced signals acquired by interlaced readout.

In the binning process, the combination pattern of added pixel signals is changed on a per-frame basis as shown in FIG. 3(a) to FIG. 3(d), for example, whereby the added signals (binned signals) as shown in FIG. 4(a) to FIG. 4(d) are sequentially read out by the image sensor 1.

In the interlaced readout process, an interlacing pattern is changed on a per-frame basis as shown in FIG. 17(a) to FIG. 17(d), for example. In FIG. 17(a) to FIG. 17(d), pixels enclosed in circle are not skipped while the other pixels not enclosed in circle are skipped.

Specifically, the CPU 10 of FIG. 1 controls the TG 12 thereby changing the interlacing pattern on the image sensor 1 for reading out an image based on a different interlacing pattern each time. Analog image signals (interlaced signals) read out by the image sensor 1 are converted to digital image signals by the AFE 2. Subsequently, the digital image signals are sent to the imaging processor 3 which performs the resolution enhancement processing and the like on the signals so received. The digital image signals thus processed by the imaging processor 3 are compressed by the compression processing unit 4 and then, are stored in the external memory 7.

The interlacing pattern is changed on a per-frame basis as shown in FIG. 17(a) to FIG. 17(d), for example, whereby the signals (interlaced signals) as shown in FIG. 18(a) to FIG. 18(d) are sequentially read out by the image sensor 1.

In the embodiment 7, the same resolution enhancement processing as that of the embodiments 1 to 6 is performed based on the interlaced signals for plural frames individually having the different interlacing patterns whereby image signals for one frame are generated.

What is claimed is:

1. An imaging device comprising a signal readout unit which bins by adding up and reading out pixel signals from a plurality of pixels arranged in a first direction and a second direction of a pixel arrangement of an imaging element, when signals are read out from the imaging element;
    a pattern changing unit wherein there are n different combination patterns of pixel signals to be added by the signal readout unit (n is an integer of not less than 2), which changes the combination patterns of pixel signals to be added by the signal readout unit on a per-frame basis such that each different combination pattern is applied to a sequence of n frames to be read out from the imaging element; and
    a video signal generating unit which generates image signals for one frame based on signals from plural frames comprising a sequence of n frames or (n+1) frames to be read out from the imaging element by the signal readout unit.

2. An imaging device according to claim 1, wherein the video signal generating unit generates the one-frame image signals from the signals from the plural frames as referring to the signals from the plural frames comprising a sequence of n frames or (n+1) frames to be read out from the imaging element by the signal readout unit and information on motion between at least two frames of the plural frames.

3. A video signal generating method employed in an imaging device comprising a signal readout step which bins by adding up and reading out pixel signals from a plurality of pixels arranged in a first direction and a second direction of a pixel arrangement of an imaging element, when signals are read out from the imaging element;
    a pattern changing step wherein there are n different combination patterns of pixel signals to be added by the signal readout step (n is an integer of not less than 2), which changes the combination patterns of pixel signals to be added by the signal readout step on a per-frame basis such that each different combination pattern is applied to a sequence of n frames to be read out from the imaging element; and a video signal generating step which generates image signals for one frame based on signals from plural frames comprising a sequence of n frames or (n+1) frames to be read out from the imaging element by the signal readout step.

4. A video signal generating method employed in the imaging device according to claim 3, wherein the video signal generating step generates the one-frame image signals from the signals from the plural frames as referring to the signals from the plural frames comprising a sequence of n frames or (n+1) frames to be read out from the imaging element by the signal readout step and information on motion between at least two frames of the plural frames.

5. An imaging device comprising
a signal readout unit which skips pixel signals of one part of all pixels in a pixel arrangement of an imaging element and reads out pixel signals of the other pixels, the signal readout unit skipping both pixel signals in a first and a second directions of the pixel arrangement;
a pattern changing unit wherein there are n different skipping patterns of pixel signals by the signal readout unit (n is an integer of not less than 2), which changes the skipping patterns of pixel signals by the signal readout unit on a per-frame basis such that each different skipping pattern is applied to a sequence of n frames to be read out from the imaging element; and
a video signal generating unit which generates image signals for one frame based on signals from plural frames comprising a sequence of n frames or (n+1) frames to be read out from the imaging element by the signal readout unit.

6. An imaging device according to claim 5, wherein the the vide signal generating unit generates the one-frame image signals from the signals from the plural frames by referring to the signals from the plural frames comprising a sequence of n frames or (n+1) frames to be read out from the imaging element by the signal readout unit and information on motion between at least two frames of the plural frames.

7. A video signal generating method employed in an Imaging device comprising
a signal readout step which skips pixel signals of one part of all pixels in a pixel arrangement of an imaging element and reads out pixel signals of the other pixels, the signal readout step skipping both pixel signals in a first and a second directions of the pixel arrangement;
a pattern changing step wherein there are n different skipping patterns of pixel signals by the signal readout step (n is an integer of not less than 2), which changes the skipping patterns of pixel signals by the signal readout step on a per-frame basis such that each different skipping pattern is applied to a sequence of n frames to be read out from the imaging element; and
a video signal generating step which generates image signals for one frame based on signals from plural frames comprising a sequence of n frames or (n+1) frames to be read out from the imaging element by the signal readout step.

8. A video signal generating method employed in the imaging device according to claim 7, wherein the video signal generating step generates the one-frame image signals from the signals from the plural frames as referring to the signals from the plural frames comprising a sequence of n frames or (n+1) frames to be read out from the imaging element by the signal readout step and information on motion between at least two frames of the plural frames.

* * * * *

UNITED STATES PATENT AND TRADEMARK OFFICE
CERTIFICATE OF CORRECTION

| | | |
|---|---|---|
| PATENT NO. | : 8,139,123 B2 | Page 1 of 1 |
| APPLICATION NO. | : 12/513118 | |
| DATED | : March 20, 2012 | |
| INVENTOR(S) | : Tsunekawa et al. | |

It is certified that error appears in the above-identified patent and that said Letters Patent is hereby corrected as shown below:

Col. 11, line 34, claim 6, lines 1-2, please delete "the vide" and insert --video--

Signed and Sealed this
Sixteenth Day of October, 2012

David J. Kappos
*Director of the United States Patent and Trademark Office*